Patented Aug. 30, 1927.

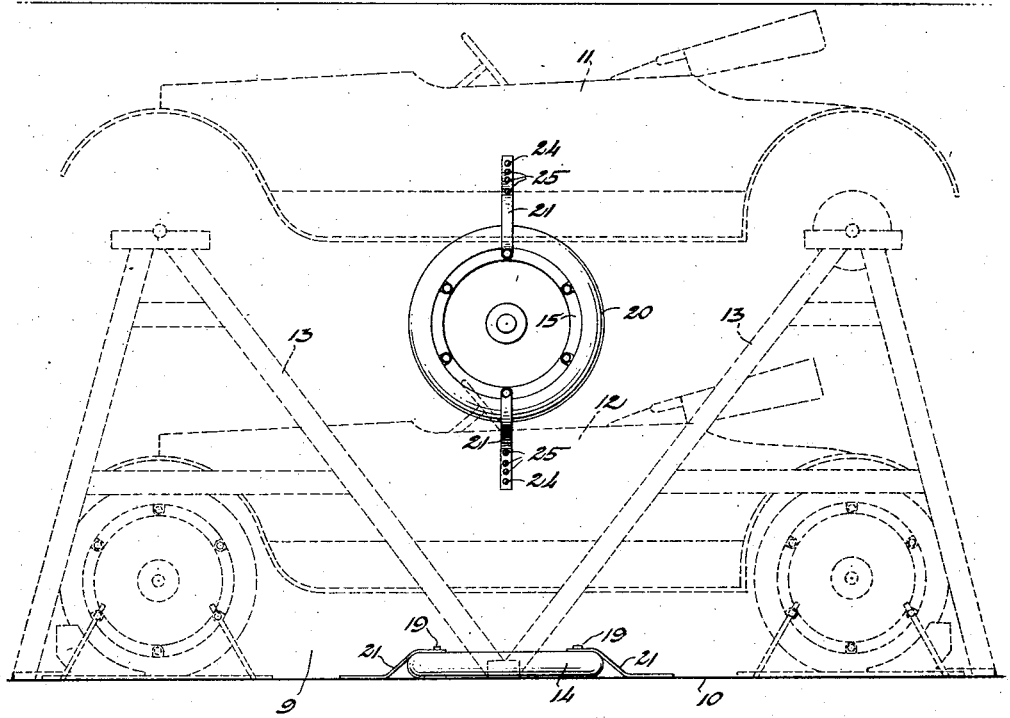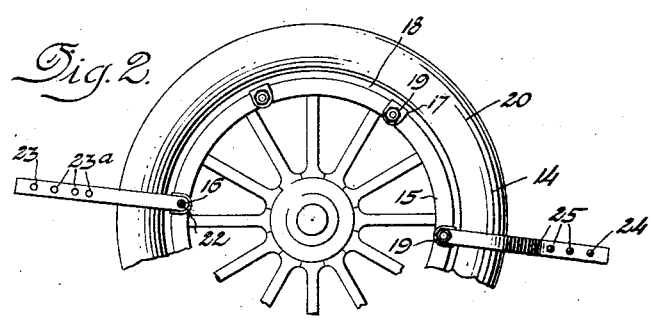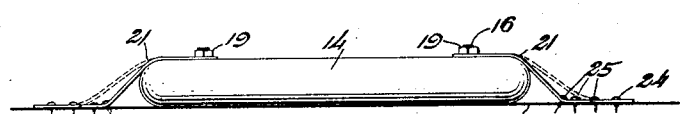

1,640,890

UNITED STATES PATENT OFFICE.

EDWARD T. ESTERBROOK, OF FLINT, MICHIGAN, ASSIGNOR TO GENERAL MOTORS CORPORATION, OF DETROIT, MICHIGAN, A CORPORATION OF DELAWARE.

WHEEL-SHIPPING STRAP.

Application filed October 10, 1921. Serial No. 506,793.

This invention relates to shipping devices for vehicle wheels.

An object of the invention is the provision of new and improved means for securing detached wheels to the floors or walls of cars, boats, or other conveyances for shipment.

Another object of the invention is the provision of means and so arranging the same that the wheel will not have its finish marred or its structure injured during shipment, and will be held against its support in such a manner as to prevent any movement thereof during the jarring, jerking or jolting of the shipping conveyance incident to the movement or travel of said conveyance.

A further object of the invention is the provision of means for securing a wheel to its support for shipment that will eliminate all danger of marring the finish of the wheel during the attaching and detaching operation.

Another object of the invention is a method of tensioning the wheel holding tie members, whereby the wheel will be held securely in position during shipment.

Other objects are the provision of a tie or brace that is cheap to manufacture, light and simple in construction, efficient in operation and that may be readily and easily attached to, or detached from, the wheel.

Other and further objects and advantages of the invention will appear as the description proceeds.

On the drawing:

Figure 1 is an elevational view of wheels secured in shipping position in a shipping conveyance, with vehicles secured in position for shipments shown in dotted lines;

Figure 2 is a plan view of the wheel and the securing means attached thereto, parts broken away; and Figure 3 is an elevation thereof.

On the drawing, the reference numeral 9 denotes a wall and 10 the floor of a car, boat or other shipping conveyance on which are shown the vehicles 11 and 12 in position for shipment, as shown in dotted lines in Fig. 1.

It is usual in shipping automobiles to deck them in the car; that is, to support the upper car, as the car 11, above the floor 10 by any suitable decking means such as the supports or decking devices 13. The lower automobiles as the car 12 is secured to the floor 10 directly beneath the car 11. In such an arrangement it is necessary to remove the wheels 14 of the upper car and it is customary to secure these wheels to the floor or walls of the shipping conveyance.

The wheels 14 are provided with the usual fellies 15 having the rim bolts 16 therethrough for engaging the wedges 17 for securing the rim 18 on the felly. The rim bolts 16 are provided with nuts 19 by means of which the wedges are secured in adjusted position. The rims 18 are provided with the usual tires 20.

When a wheel 14 is removed it is laid flat-wise on the floor 10 beneath the lower car 12 and secured in position thereon by the tie members 21, some or all of the wheels, if desired, may be secured to the side or end walls of the conveyance by the members 21, as clearly shown in Figure 1. These tie members may be made from strips of sheet metal. Each member 21 is provided at one end thereof with an aperture 22 which is adapted to engage the rim bolt 16. The other end of the bracing member is provided with apertures 23 for the reception of suitable fastening means such as nails or screws.

In securing the wheels 14 for shipment the tie members 21 are secured to the rim bolts 16 by means of the nuts 19 after which the wheels are laid flat-wise on their supports and the tie members secured to the same. Any suitable number of the members 21 may be employed. As shown on the drawings, two of these members are employed for each wheel and are arranged 180° apart about the same. After securing the inner ends of the tie members 21 to the rim bolts and placing the wheel on the floor or wall, fastening members 24 are driven through the outer apertures 23 into the floor or wall, thus bending the member 21 over the tire 20 and causing the same to take the dotted line position as shown in Figure 3. It will be noted that the wedges 17 and the tire 20 prevent the tie members from coming in contact with the wheel to mar the finish thereof.

The order of attaching the tie members to the wheel and to the support may of course be varied to meet the requirements of any particular case or circumstances, it being immaterial whether they are attached to the wheel or support before or after the wheel is in position on the support.

The tie members are tensioned by distorting an intermediate portion of one or more of the same. An easy and convenient method of tensioning the tie members is to provide an intermediate portion of one or more of the tie members with apertures 23ª through which additional fastening means such as nails or screws 25 may be driven into the support for drawing said portion from the dotted line to the full line position shown on the drawing, thus tensioning the tie members and securing the same in such position as to securely hold the wheel.

While I have shown my device in use on wheels in position for shipment along with automobiles, it is understood that these devices may be employed to secure wheels to the floor or walls of shipping conveyances whether or not they are accompanied by vehicles or other parts of the same.

It is thought from the foregoing taken in connection with the accompanying drawings that the construction and operation of my device will be apparent to those skilled in the art; and that various changes in size, shape and proportion and details of construction may be made without departing from the spirit and scope of the appended claim.

I claim:

A method for shipping vehicle wheels consisting in placing them flatwise engaging throughout their circumference upon a flat supporting surface, attaching tie members by their inner ends to the rim bolts on said wheel, extending said tie members outwardly, securing the outer ends of said tie members to said support and tensioning said tie members by distorting the intermediate portion of one of said members.

In testimony whereof I affix my signature.

EDWARD T. ESTERBROOK.